United States Patent
Farbotnik

[11] Patent Number: 6,138,980
[45] Date of Patent: Oct. 31, 2000

[54] PILOT MOUNTING

[75] Inventor: Donald M. Farbotnik, Cambridge Springs, Pa.

[73] Assignee: Lord Corporation, Cary, N.C.

[21] Appl. No.: 09/339,736

[22] Filed: Jun. 24, 1999

[51] Int. Cl.[7] .................................................. F16F 7/00
[52] U.S. Cl. ...................... 248/638; 267/141.4; 248/634
[58] Field of Search ........................... 248/634, 56, 638, 248/635; 267/141.2, 141.3, 141.4

[56] References Cited

U.S. PATENT DOCUMENTS

| | | | |
|---|---|---|---|
| 1,844,755 | 2/1932 | Geyer et al. | 248/634 |
| 2,132,840 | 10/1938 | Workman et al. | 267/141.4 |
| 2,422,683 | 6/1947 | Kaemmerling | 248/358 |
| 2,693,331 | 11/1954 | Soldan | 248/18 |
| 2,926,881 | 3/1960 | Painter | 248/358 |
| 3,128,999 | 4/1964 | Schmitt | 267/1 |
| 3,236,326 | 2/1966 | Reynolds | 248/634 |
| 3,460,786 | 8/1969 | Rivin | 248/634 |
| 3,467,353 | 9/1969 | Peterson et al. | 248/358 |
| 3,756,551 | 9/1973 | Bishop | 248/358 R |
| 3,895,408 | 7/1975 | Leingang | 16/2 |
| 4,215,842 | 8/1980 | Brenner et al. | 248/634 |
| 4,306,708 | 12/1981 | Gassaway et al. | 267/141.3 |
| 4,530,491 | 7/1985 | Bucksbee et al. | 267/141.2 |
| 4,711,135 | 12/1987 | Horiuchi et al. | 248/638 |
| 4,720,075 | 1/1988 | Peterson et al. | 248/635 |
| 4,783,039 | 11/1988 | Peterson et al. | 248/635 |
| 4,799,571 | 1/1989 | Bopp | 180/294 |
| 4,858,866 | 8/1989 | Werner | 248/635 |
| 4,858,880 | 8/1989 | Durand | 248/635 |
| 4,867,461 | 9/1989 | Shimmell | 277/166 |
| 5,141,203 | 8/1992 | Baker et al. | 248/638 |
| 5,174,540 | 12/1992 | Gilliam | 267/141.3 |
| 5,295,414 | 3/1994 | Nakamura et al. | 74/655 |
| 5,536,021 | 7/1996 | Boehmer et al. | 277/207 R |
| 5,842,677 | 12/1998 | Sweeney et al. | 248/634 |
| 5,876,024 | 3/1999 | Hain | 267/141.4 |
| 5,934,171 | 8/1999 | Thompson | 92/161 |
| 6,029,942 | 2/2000 | Daddis, Jr. et al. | 248/634 |

FOREIGN PATENT DOCUMENTS

| | | | |
|---|---|---|---|
| 586517 | 11/1959 | Canada | 248/634 |
| 1026289 | 10/1950 | France | 248/634 |
| 2083591 | 1/1982 | United Kingdom | 248/638 |
| 092004556 | 3/1992 | WIPO | 248/638 |

*Primary Examiner*—Ramon O. Ramirez
*Assistant Examiner*—Jon Szumny
*Attorney, Agent, or Firm*—Randall S. Wayland; Michael M. Gnibus; James W. Wright

[57] ABSTRACT

An elastomeric mounting configured to be inserted in a pocket in a vibrating first member and to isolate the first member from a second member on which the first member is mounted. The mounting includes a rigid tube, a substantially rigid radial disk at one end of the mounting, and an elastomeric member including a tubeform section essentially surrounding the rigid tube and a sandwich section bonded to an axially projecting surface of the rigid radial disk and extending radially outward from the tubeform section.

18 Claims, 2 Drawing Sheets

PILOT MOUNTING

BACKGROUND OF THE INVENTION

1. Field of the Invention

This invention relates to elastomeric mountings. In particular, this invention relates to elastomeric mountings for isolating vibrations.

2. Description of the Related Art

Numerous types of elastomeric mounts have been developed for isolating a first vibratory member from a second member. Bonded rubber or other elastomer mounts have been designed specifically for complex vibration and shock control problems. The adverse effects of vibration, shock and noise disturbances range from simple annoyances to shortened equipment life through failure of the components of the equipment, as well as effects on comfort, safety and performance. One example of an environment where such mounts are useful is where a pump is mounted within a transmission housing. Thus, mounts for use in engines, cabs, fuel tanks, pumps, air conditioning units, compressors, industrial machinery and the like have included permanently bonded elastomers designed to isolate vibration in all directions and to attenuate noise.

The foregoing illustrates limitations known to exist in present devices and methods. Thus it is apparent that it would be advantageous to provide an alternative directed to overcoming one or more of the limitations set forth above. Accordingly, a suitable alternative is provided including features more fully disclosed hereinafter.

SUMMARY OF THE INVENTION

The elastomeric mounting of the present invention is particularly designed to isolate vibrations of a second member from a first member. For example, the elastomeric mounting may be used in an isolation system for isolating a vibratory member (e.g., a pump) from a casing. A pilot on the pin member holding the casing to the elastomeric mounting is received into an elastomeric layer inside a bore in the mounting and does not make a metal-metal contact.

According to the invention, an elastomeric mounting is configured to be inserted in a pocket in a vibrating first member and to isolate the first member from a second member to which the first member is mounted. The mounting of the invention comprises a rigid tube, a substantially rigid radial disk at one end of the mounting, and an elastomeric member including a tubeform section essentially surrounding the rigid tube and a sandwich section bonded to an axially projecting surface of the rigid radial disk and extending radially outward from the tubeform section.

Other objects, features and details of the invention will be more fully apparent from the following figures, detailed description and appended claims.

DETAILED DESCRIPTION OF THE INVENTION AND PREFERRED EMBODIMENTS THEREOF

Figure 1:
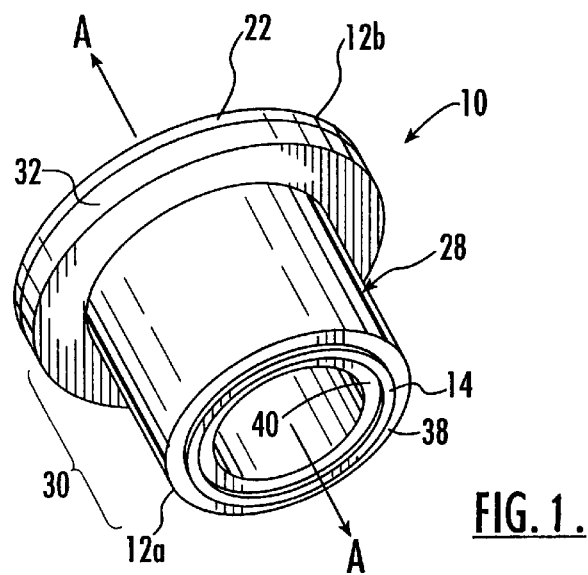
FIG. 1 is a perspective view of a mounting having an axis A, according to the present invention.
Figure 2:
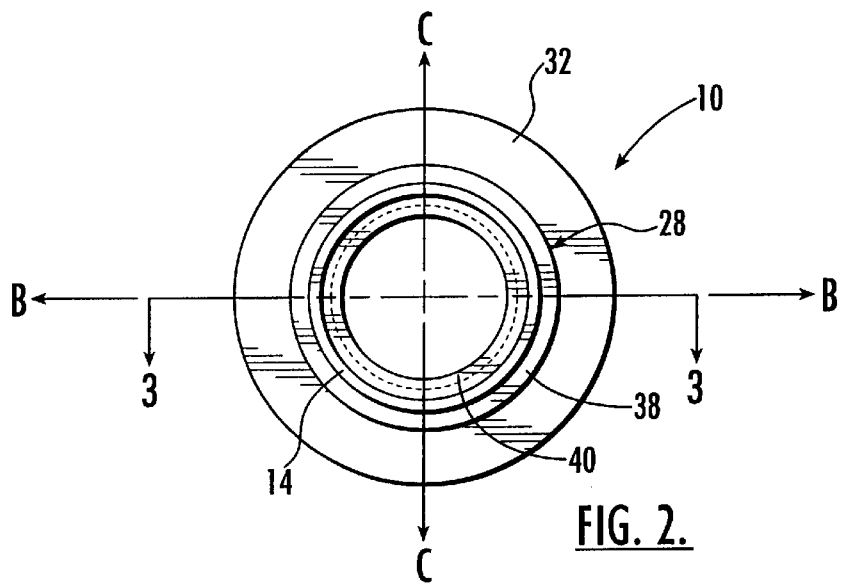
FIG. 2 is a plan view of a first end of the mounting according to the present invention.

The present invention is a mounting that will be described more fully hereinafter with reference to the accompanying drawings in which preferred embodiments of the invention are shown. This invention may be embodied in many different forms, however, and should not be construed as limited to the embodiments set forth herein.

Referring now to the Figures, the mounting of the invention herein enables isolation of a first vibratory member from a second member. The mounting 10 of the invention is shown in FIGS. 1–4. The mounting 10, having opposing first and second ends 12a, 12b, comprises a rigid tube 14 (FIG. 3) having an outside surface 16 and an interior cylindrical wall 20. The tube 14 extends from the first end 12a toward the second end 12b, but not all of the way to the second end 12b.

A substantially rigid radial disk 22 is located at the second end 12b spaced apart from the rigid tube 14 and axially aligned therewith. The radial disk 22 has a central hole 24. A first axially projecting surface 26a of the radial disk 22 faces the rigid tube 14.

Figure 3:
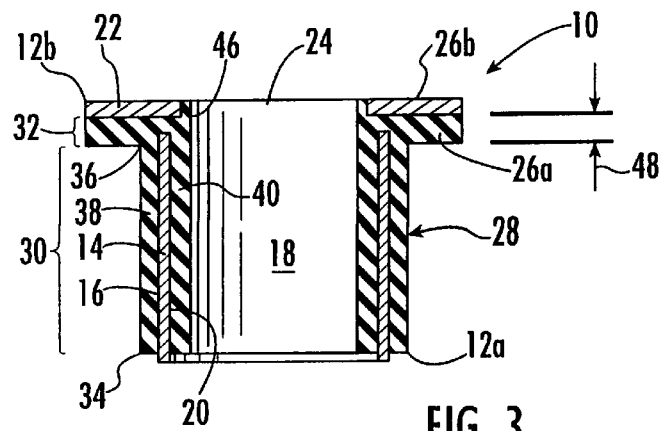
FIG. 3 is a cross-sectional view along line B—B of FIG. 2.

An elastomeric member 28 comprises a tubeform section 30 and a sandwich section 32 which together essentially surround most of the rigid tube 14. The tubeform section 30 has a first end 34 and a second end 36 and is formed of a first annular element 38 and a second annular element 40, preferably of substantially equal thickness. The first annular element 38 is bonded to the outside of the rigid tube 14, and the second annular element 40 is bonded to the interior cylindrical wall 20 and forms inside bore 18. As shown in FIG. 3, the rigid tube 14 extends beyond the second end 36 of the tubeform section 30. Preferably the rigid tube 14 at the first end 12a of the mounting 10 extends beyond the end of the tubeform section 30 as shown in FIGS. 1, 3. This supports the rigid tube 14 during the molding process, but is not critical for the use of the invention.

Figure 4:
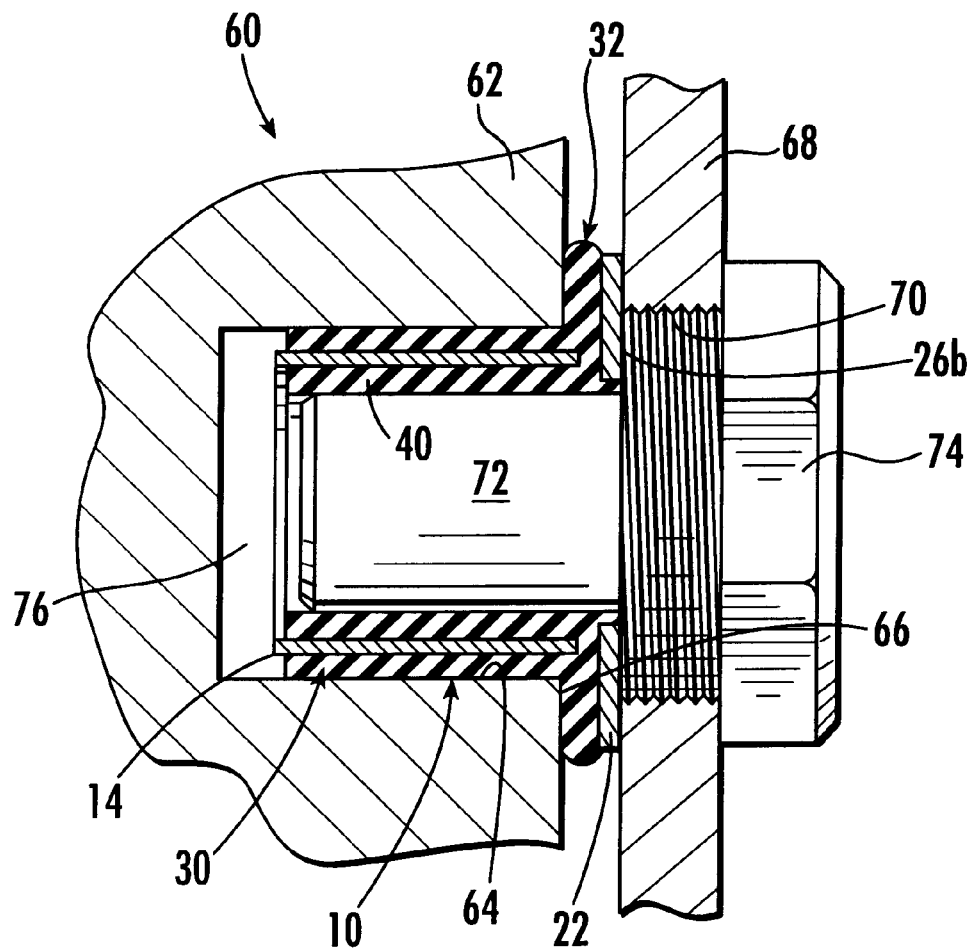
FIG. 4 is a cross-sectional view of the mounting of the invention installed in an isolation system according to the invention.

The central hole 24 of the radial disk 22 is aligned with the bore 18 as shown in FIGS. 3 and 4. Preferably the diameter of the hole 24 is greater than the inner diameter of the bore 18, and an inner elastomer cylinder 46 having an inner diameter substantially equal to the diameter of the bore 18 is positioned within the hole 24. A second axially projecting surface 26b of the radial disk 22 forms a portion of the second end 12b of the mounting 10 of the invention.

The sandwich section 32 is bonded to the first axially projecting surface 26a, and extends radially outward from the second end 36 of the tubeform section 30 (FIG. 3). Preferably, the sandwich section 32 has an outer axial thickness 48 greater than the distance between the rigid radial disk 22 and the rigid tube 14.

The mounting 10 of the invention is preferably made by transfer molding or compression molding using methods known in the art. A magnet may be used to hold the radial disk 22 separate from the rigid tube 14 during the molding process. Preferably the elastomer comprises material selected from the group consisting of natural and synthetic rubber or blends thereof. The elastomer must be a rubberlike, substantially incompressible material. Preferably the elastomer is nitrile, having a Shore (Type A) durometer hardness of about 60. Preferably the rigid tube 14 and the radial disk 22 comprise material selected from the group consisting of steel, brass, aluminum and polymeric resin. An advantage of using brass is that brass characteristically self-bonds to standard elastomeric materials.

The mounting of the invention is preferably used in an isolation system 60, one example of which is shown in FIG. 4. Such an isolation system 60 generally comprises a vibratory first member 62 having a pocket 64, a surface 66 surrounding the pocket 64, and an outer second casing member 68 having a hole 70 for attaching the mounting 10 and the vibratory first member 62. Pin member 74 is threaded into the hole 70 in the casing 68 and includes a larger diameter portion that extends slightly beyond the casing. Because pin 74 has a larger diameter than central hole 24, the pin 74 abuts axially projecting surface 26b so that the sandwich section 32 is axially compressed by about 10% between the vibratory first member 62 and the radial disk 22 resulting in the slight elastomer bulge shown. A cylindrical pilot 72 extending from the pin member 74 is received inside the bore 18 so that the portion of the pilot within the pocket 64 preferably rests entirely inside the second annular element 40. The mounting fits snugly in the pocket 64, and the pilot 72 fits snuggly in the bore 18, such that both the first and second annular elements 38, 40 include approximately a 10% radial precompression.

In one preferred embodiment of the isolation system 60, the vibratory first member 62 comprises a pump and the outer second member 68 comprises a housing in which the pump is mounted. As the vibratory first member 62 vibrates radially, for example, the load is transferred in sequence to the first annular element 38, the rigid tube 14, the second annular element 40, and the pilot 72.

The pocket 64 may have a depth greater than the length of the tubeform section 30, so that an axial sway space 76 is formed between the first end 12a of the tubeform section 30 and the bottom of the pocket 64 as shown in FIG. 4, so that with normal loads the second end 12b of the mounting remains separated from the bottom of the pocket 64.

In a preferred embodiment, the first elastomeric element 38 and second elastomeric element 40 of the mounting 10 of the invention are each 0.125 inch thick (3.175 mm). Although it is preferred that the thickness of the elastomeric elements be the same, this is not essential. Moreover, various shapes may be imparted to the elastomeric elements. The spring rate of the mounting in the radial direction perpendicular to axis A is about 45,000 lb./inch (257.14 Newtons/meter), for example along axis B or C, and axially along the axis A is about 3300 lb./inch (18.86 Newtons/meter) at 200° F. (366.5° K). The thickness of rigid tube 14 between the outside surface 16 and the interior cylindrical wall 20 is about 0.06 inches (1.52 mm). The distance between the radial disk 22 and the rigid tube 14 is preferably about 0.09 inch (2.29 mm). The rigid tube 14 in the preferred embodiment has a diameter of approximately 1.35 inches (34.3 mm) and a length of approximately 1.35 inches (34.3 mm). The radial disk 22 has an outer diameter of approximately 2.25 inches (57.2 mm).

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A mounting having opposing first and second ends said mounting adapted to be mounted between a first member and a pilot on a second member, the mounting comprising:
    a rigid tube having an outside surface and an interior cylindrical wall, said tube extending from said first end of said mounting toward said second end of said mounting;
    a substantially rigid radial disk at said second end of said mounting spaced apart from said rigid tube and axially aligned therewith, said radial disk having a central hole and having first and second axially projecting surfaces, said first axially projecting surface facing said rigid tube; and
    an elastomeric member, including;
        a tubeform section having a first end and a second end and formed of a first annular element and a second annular element, said first annular element bonded to the outside surface of said rigid tube, and said second annular element bonded to said cylindrical wall, forming an inside bore, said inside bore adapted to receive said pilot, wherein the diameter of said hole in said radial disk is greater than the inner diameter of said bore and the elastomer member further comprises an inner elastomer cylinder within said hole in said radial disk; and
        a sandwich section bonded to said first axially projecting surface and extending radially outward from said second end of said tubeform section.

2. The mounting of claim 1, wherein the rigid tube comprises material selected from the group consisting of steel, aluminum, brass and polymeric resin.

3. The mounting of claim 1, wherein said first annular element and said second annular element are of substantially equal thickness.

4. The mounting of claim 1, wherein the rigid tube extends beyond said second end of the tubeform section.

5. The mounting of claim 1, wherein said rigid tube extends beyond said first end of said tubeform section.

6. The mounting of claim 1, wherein the sandwich section has an outer axial thickness greater than the distance between the rigid radial disk and the second end of the tubeform section.

7. The mounting of claim 1, wherein the elastomer member comprises material selected from the group consisting of natural rubber, synthetic rubber and blends thereof.

8. The mounting of claim 7, wherein the elastomer member comprises nitrile.

9. An isolation system, comprising:
    a vibratory first member having a pocket and a surface surrounding said pocket;
    an outer second member having a hole for attaching said first vibratory member; and
    a mounting having opposing first and second ends, said mounting adapted to be mounted between said vibratory first member and said outer second member, including;
    a rigid tube having an outside surface and an interior cylindrical wall joined by first and second free tube ends, said tube extending axially from said first end of said mounting, said first and second free tube ends being linearly aligned; toward said second end of said mounting;
    a substantially rigid radial disk at said second end of said mounting adjacent the second free tube end, said rigid radial disk being substantially perpendicular to said rigid tube and axially aligned therewith, said radial disk having a central hole and having first and second axially projecting surfaces, said first axially projecting surface facing said rigid tube; and
    an elastomeric member, comprising:
        a tubeform section having a first end and a second end and formed of a first annular element and a second annular element, said first annular element bonded to the outside surface of said rigid tube, and said second annular element bonded to said cylindrical wall, forming an inside bore, said inside bore adapted to receive a pilot; and
        a sandwich section bonded to said first axially projecting surface and extending radially outward from said second end of said tubeform section, the sandwich section being adjacent the second free rigid tube end, wherein said first end of said mounting is received in said pocket of said vibratory first member so that said sandwich section is received adjacent to said surface of said vibratory first member and said second axially projecting surface is in abutting relationship with an inner face of said outer second member to isolate said vibratory first member from said outer second member.

10. The isolation system of claim 9, wherein the pocket has a depth greater than the length of the tubeform section so that a sway space is formed between the first end of the mounting and the pocket.

11. The isolation system of claim 9, further comprising a threaded pin member received in said inside bore and including a pilot received in direct contacting relationship with the second annular element.

12. The isolation system of claim 9, wherein said first annular element and said second annular element are of substantially equal thickness.

13. The isolation system of claim 9, wherein the rigid tube extends beyond said second end of the tubeform section.

14. The isolation system of claim 9, wherein said rigid tube extends beyond said first end of said tubeform section.

15. The isolation system of claim 9, wherein the sandwich section has an outer axial thickness greater than the distance between the rigid radial disk and the second end of the tubeform section.

16. The isolation system of claim 9, wherein the elastomer member comprises material selected from the group consisting of natural rubber, synthetic rubber and blends thereof.

17. The isolation system of claim 9, wherein the elastomer member comprises nitrile.

18. An isolation system, comprising:
   a vibratory first member having a pocket and a surface surrounding said pocket;
   an outer second member having a hole for attaching said first vibratory member;
   a threaded pin received in said hole, said threaded pin including a cylindrical pilot; and
   a mounting having opposing first and second ends, said mounting adapted to be mounted between said vibratory first member and said pilot, said mounting including;
   a rigid tube having an outside surface and an interior cylindrical wall, said tube extending from said first end of said mounting toward said second end of said mounting,
   a substantially rigid radial disk at said second end of said mounting spaced apart from said rigid tube and axially aligned therewith, said radial disk having a central hole and having first and second axially projecting surfaces, said first axially projecting surface facing said rigid tube, and
   an elastomeric member further including;
      a tubeform section having a first end and a second end and formed of a first annular, cylindrical element and a second annular, cylindrical element, said first element and said second element being of substantially equal thickness, said first element bonded to the outside surface of said rigid tube, and said annular element bonded to said cylindrical wall, forming an inside bore, said inside bore adapted to receive said pilot, and
      a sandwich section bonded to said first axially projecting surface and extending radially outward from said second end of said tubeform section, wherein said first end of said mounting is received in said pocket of said vibratory first member so that said sandwich section is received adjacent to said surface of said vibratory first member and said second axially projecting surface is in abutting relationship with an inner face of said outer second member to isolate said vibratory first member from said outer second member, said pilot is received in direct contacting relationship with the second annular element, and a sway space is formed between the first end of the mounting and the pocket.

* * * * *